March 21, 1967     D. K. SLOSBERG     3,310,619
VINYL-ACRYLIC FLOOR COVERING AND PROCESS
Filed June 6, 1963
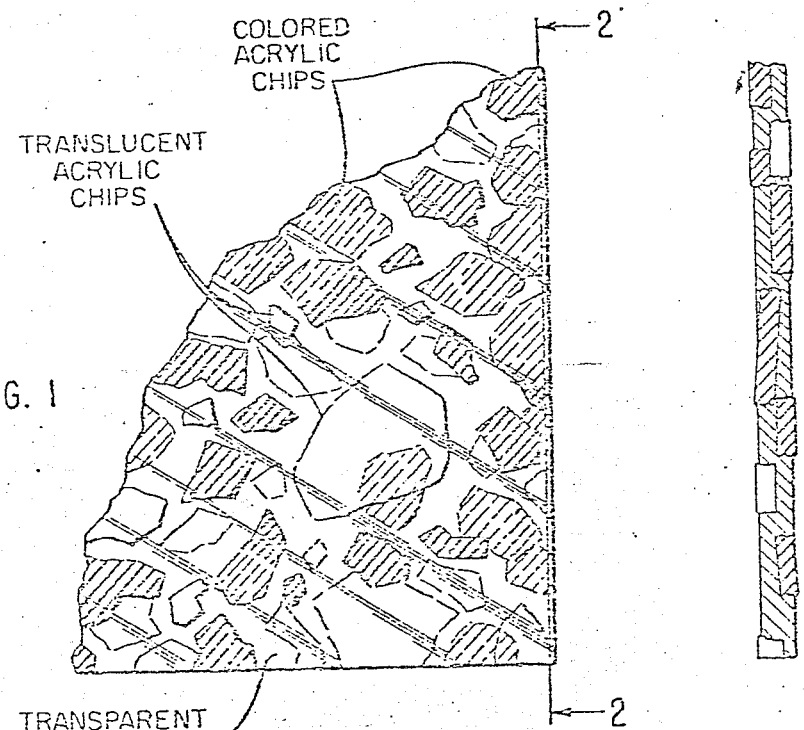
INVENTOR
DAVID K. SLOSBERG
ATTORNEYS 3,310,619
VINYL-ACRYLIC FLOOR COVERING
AND PROCESS
David K. Slosberg, Yardley, Pa., assignor to American
Biltrite Rubber Co., Inc., Chelsea, Mass., a corporation of Delaware
Filed June 6, 1963, Ser. No. 285,984
2 Claims. (Cl. 264—77)

This invention comprises a new and improved floor or wall covering presenting a random pattern of vivid color contrasts and rough or smooth surface texture as desired and includes within its scope a novel process of making the same.

The invention is based upon my discovery that chips or granules of modified methyl methacrylate (which may be of various brilliant colors) are compatible with a PVC or PVC copolymer to the extent that they may be distributed and permanently bonded or capsulated without exhibiting excessive thermoplastic flow within a translucent vinyl matrix in accordance with manufacturing processes that are commercially practical.

These methyl methacrylate granules may be prepared by cutting or chopping sheets of cast acrylic of the desired color and pattern. The sheets of acrylic may be prepared (as is well known in the trade) by casting acrylic syrup with appropriate catalysts and modifiers between glass plates which have been separated by gaskets of desired thickness. A satisfactory formula for the syrup is as follows:

|  | Range | Typical |
| --- | --- | --- |
| Methyl methacrylate monomer | (Uninhibited) | 100 |
| Ethylene glycol dimethacrylate | .25 to 10% | 2 |
| Benzoyl peroxide | .05% to 0.1% | .05 | and then when cast cutting or chopping it into granules or chips of convenient size and shape.

The acrylic chips are now mixed with a dry vinyl blend which may or may not contain pigment powder. It is then subjected to pressure to about 1000 p.s.i. and heat at 350° in a hydraulic press and this may be varied somewhat according to the formula of the blend. The acrylic granules are compatible in a sense that they form a permanent bond with the vinyl compound without cement or adhesive of any kind. In the pressing and fluxing operation the vinyl compound is fused and forms a matrix about the acrylic chips. These acrylic granules become partially thermoset when the acrylic resin is made, due to the presence of the cross-linking agents as set forth below.

The distortion of the granules under heat and pressure is much less than a normal unmodified thermoplastic methyl methacrylate polymer granule. The degree of distortion under heat and pressure may be varied by changing the amount of cross-linking agent present in the formula for the partially thermoset polymer. This distortion may be considered to a limited degree as compression; primarily it consists of a slight modification of the configuration of the granule due to the heat and pressure. While the methyl methacrylate is preferred since it has the highest heat distortion point and the optimum in properties for our work, any of the following acrylic polymers will serve to a lesser degree if they are cross-linked (in blends or used as sole ingredient). The methacrylate esters are harder and esters of higher homologs range from very hard to amorphous waxy polymers. Cross-linking agents are vital in obtaining the partially thermoset character in the acrylic granule. They are normally used at concentrations of .25% to 10% of the monomer. Typical crosslinkers are:

Ethylene glycol dimethacrylate,
1.3 butylene glycol dimethacrylate,
Other dimethacrylates and diallylic compounds and others.

The sheet resulting from the pressing and fluxing presents a smooth surface texture. If now a rough texture is desired the sheet may be heated to a degree approaching the original pressing temperature. At 350° the vinyl component and the acrylic granules become softened to an extent permitting return to substantially their original configuration and they will therefore cause corresponding protuberances in the surface contour of the softened sheet. On cooling, this textured effect remains. At lower temperature the acrylic granules will partially recover their original configuration.

The rate of recovery of the acrylic granules is not linear with respect to temperature. On the material herein specified there is no change up to 195° F. At any point above this temperature the recovery will vary with the length of time the slab is kept at a given temperature; e.g. almost 100% recovery can be obtained at 250° F. in twenty minutes.

A satisfactory formula for the dry vinyl blend is as follows:

| | |
| --- | --- |
| Polyvinyl chloride | 100 |
| Dioctyl phthalate | 25 |
| Epoxidized soya bean oil | 5 |
| Barium, cadmium, zinc organic stabilizer | 3 |
| | 133 |

Normally PVC is used. However, copolymers of PVC (including acetate, maleate, fumerate, etc.) can be substituted in whole, or part.

In the accompany drawings:
FIG. 1 is a fragmentary plan view of cover material showing a preferred embodiment thereof, and
FIG. 2 is a sectional view on the line 2—2 of FIG. 1 showing the surface contour of the material.

In FIG. 1 the components of the material are labeled. The "colored acrylic chips" may be assumed to be of a brilliant blue color, the "translucent acrylic chips" are of a pearl shade, and the "transparent vinyl matrix" indicate the transparency of that component.

Suitable acrylic polymers may be made up from available acrylic monomers, such as methyl or ethyl or butyl acrylate; or methyl or ethyl or butyl methacrylate, or the like.

The acrylic material becomes thermoset or rather cross-linked during the actual polymerization of the monomer due to the presence of the cross-linking agent. The term "thermoset" more properly designates the cross-linking of the polymer to inhibit the thermoplasticity of the material. Methyl methacrylate monomer which is polymerized without a cross-linking agent is thermoplastic. It does not exhibit the recovery or plastic memory properties of the partially cross-linked material.

Having thus disclosed my invention and described in detail an illustrative embodiment thereof, I claim as new and desire to secure by Letters Patent:

1. The process of making vinyl-acrylic floor or wall covering sheet comprising the steps of
preparing a dry blend of polyvinyl chloride;
preparing chips of methyl methacrylate resin, the resin being cast from a syrup having the following composition:

| | Percent |
| --- | --- |
| Benzoyl peroxide (catalyst) | 0.02–0.1 |
| Cross-linking agent | 0.25–10 |
| Methacrylate monomer | Balance | and the cast resin being thereafter comminuted to form chips;

mixing the dry blend and the chips, the dry blend being in such quantity that when fused it forms a matrix for the chips;

heating and pressing the mixture of dry blend and chips at a temperature of approximately 350° F. and a pressure of approximately 1000 pounds per square inch in a pressing means having a smooth surface which is presented to one side of the mixture, thereby to form a smooth-sided sheet of fused vinyl resin with said chips embedded therein, the chips being deformed by the pressing means into a shape other than their original shape;

removing the fused sheet from the pressing means after it has cooled to below the softening temperature of the fused vinyl resin; and thereafter subjecting the fused sheet to a temperature within the range of 195°–250° F. to cause the vinyl resin to soften and to permit the chips to recover at least partially their original shapes.

2. The process of claim 1 in which the methacrylate is a methyl methacrylate, the cross-linking agent is ethylene glycol dimethacrylate, and the methyl methacrylate cast resin has the composition:

| | Parts by weight |
|---|---|
| Benzoyl peroxide | 0.05 |
| Ethylene glycol dimethacrylate | 2.0 |
| Methylmethacrylate monomer | 100 | and the dry blend has the composition:

| | |
|---|---|
| Polyvinyl chloride | 100 |
| Dioctyl phthalate | 25 |
| Epoxidized soya bean oil | 5 |
| Barium, cadmium, zinc organic stabilizer | 3 |

References Cited by the Examiner
UNITED STATES PATENTS
3,194,859  7/1965  Wacker _____ 161—5

ALEXANDER WYMAN, Primary Examiner.
JACOB STEINBERG, Examiner.